United States Patent
Hagen

(10) Patent No.: US 9,829,894 B2
(45) Date of Patent: Nov. 28, 2017

(54) METHOD FOR OPERATING A TANK DEVICE, AND CORRESPONDING TANK DEVICE

(71) Applicant: AUDI AG, Ingolstadt (DE)

(72) Inventor: Harald Hagen, Creussen (DE)

(73) Assignee: AUDI AG, Ingolstadt (DE)

(*) Notice: Subject to any disclaimer, the term of this patent is extended or adjusted under 35 U.S.C. 154(b) by 183 days.

(21) Appl. No.: 14/387,502

(22) PCT Filed: Mar. 23, 2013

(86) PCT No.: PCT/EP2013/000882
§ 371 (c)(1),
(2) Date: Sep. 23, 2014

(87) PCT Pub. No.: WO2013/143675
PCT Pub. Date: Oct. 3, 2013

(65) Prior Publication Data
US 2015/0129046 A1    May 14, 2015

(30) Foreign Application Priority Data

Mar. 24, 2012   (DE) .................. 10 2012 059 996

(51) Int. Cl.
*B60K 15/03*        (2006.01)
*B60K 15/035*       (2006.01)
(Continued)

(52) U.S. Cl.
CPC ..... *G05D 7/0652* (2013.01); *B60K 15/03519* (2013.01); *G05D 23/1925* (2013.01);
(Continued)

(58) Field of Classification Search
USPC .... 137/43, 44, 587, 588, 341; 123/516, 518, 123/519, 520, 198 D; 251/129.05
See application file for complete search history.

(56) References Cited

U.S. PATENT DOCUMENTS 4,141,539 A * 2/1979 Bornor ............... C21D 1/767
                                                   236/15 BF
4,147,746 A * 4/1979 Dever, Jr. ........... B29C 44/60
                                                   264/261
(Continued)

FOREIGN PATENT DOCUMENTS

DE      37 43 309 C2    6/1989
DE      195 40 021       4/1997
(Continued)

OTHER PUBLICATIONS

International Search Report issued by the European Patent Office in International Application PCT/EP2013/000882.

*Primary Examiner* — Kevin Murphy
*Assistant Examiner* — Jonathan Waddy
(74) *Attorney, Agent, or Firm* — Henry M. Feiereisen LLC.

(57) ABSTRACT

In a method for operating a tank device of a motor vehicle, with the tank device having a tank and a tank ventilation device with at least one switching valve, an excitation current can be applied to the switching valve, and the switching valve opens only when the excitation current exceeds an excitation current threshold over a certain period of time. Provision is hereby made to apply an excitation current which is greater than the excitation current threshold, at least temporarily, in a first mode of operation to the switching valve for heating purposes, also when ventilation of the tank is not governed by a control unit of the tank device.

11 Claims, 3 Drawing Sheets

(51) Int. Cl.
*G05D 7/06* (2006.01)
*G05D 23/19* (2006.01)

(52) U.S. Cl.
CPC ............... *B60K 2015/03296* (2013.01); *B60K 2015/03302* (2013.01); *B60K 2015/03388* (2013.01); *B60K 2015/03514* (2013.01); *Y10T 137/0402* (2015.04); *Y10T 137/1189* (2015.04); *Y10T 137/6606* (2015.04); *Y10T 137/86332* (2015.04)

(56) References Cited

U.S. PATENT DOCUMENTS

| | | | | |
|---|---|---|---|---|
| 4,605,032 | A * | 8/1986 | Hayashi | B60K 15/03504 137/44 |
| 5,078,110 | A | 1/1992 | Rodefeld | |
| 5,201,341 | A * | 4/1993 | Saito | F02D 7/02 123/557 |
| 5,692,480 | A | 12/1997 | Kato | |
| 5,791,318 | A | 8/1998 | Schulz | |
| 6,032,088 | A | 2/2000 | Feldmann et al. | |
| 6,533,002 | B1 | 3/2003 | Kobayashi et al. | |
| 7,549,438 | B2 * | 6/2009 | Koenekamp | F16K 49/002 137/341 |
| 2004/0129066 | A1 | 7/2004 | Schulz | |
| 2005/0050949 | A1 | 3/2005 | Esteghlal et al. | |
| 2007/0267089 | A1 * | 11/2007 | Gray | B01D 53/04 141/59 |
| 2010/0288241 | A1 * | 11/2010 | Makino | F02M 25/0836 123/521 |
| 2010/0327199 | A1 * | 12/2010 | Linortner | F16K 31/0655 251/129.15 |
| 2011/0295482 | A1 | 12/2011 | Pearce | |
| 2012/0085424 | A1 * | 4/2012 | Hagen | B60K 15/03519 137/14 |
| 2012/0111307 | A1 | 5/2012 | Hagen | |
| 2012/0180760 | A1 * | 7/2012 | Hagen | B60K 15/03519 123/434 |
| 2014/0137948 | A1 * | 5/2014 | Hagen | B60K 15/03519 137/12 |
| 2015/0000772 | A1 * | 1/2015 | Onodera | B60K 15/03519 137/599.01 |
| 2015/0068498 | A1 * | 3/2015 | Peters | F02M 25/0854 123/520 |
| 2016/0377003 | A1 * | 12/2016 | Kuwabara | F02D 41/004 123/520 |

FOREIGN PATENT DOCUMENTS

| | | |
|---|---|---|
| DE | 195 40 943 | 5/1997 |
| DE | 196 54 563 | 7/1997 |
| DE | 197 40 347 | 3/1999 |
| DE | 101 16 693 | 10/2002 |
| DE | 101 50 420 | 4/2003 |
| DE | 102 20 223 B4 | 3/2004 |
| DE | 10 2008 063 758 | 7/2010 |
| DE | 10 2010 014 558 | 10/2011 |
| DE | 10 2010 019 831 | 11/2011 |
| DE | 10 2011 007 592 | 1/2012 |
| FR | 2 958 272 | 10/2011 |

\* cited by examiner

METHOD FOR OPERATING A TANK DEVICE, AND CORRESPONDING TANK DEVICE

CROSS-REFERENCES TO RELATED APPLICATIONS

This application is the U.S. National Stage of International Application No. PCT/EP2013/000882, filed Mar. 23, 2013, which designated the United States and has been published as International Publication No. WO 2013/143675 and which claims the priority of German Patent Application, Serial No. 10 2012 059 996.5, filed Mar. 24, 2012, pursuant to 35 U.S.C. 119(a)-(d).

BACKGROUND OF THE INVENTION

The invention relates to a method of operating a tank device of a motor vehicle, wherein the tank device includes a tank and a tank ventilation device with at least one switching valve to which an excitation current can be applied, and the switching valve opens only when the excitation current exceeds an excitation current threshold over a certain period of time. The invention further relates to a tank device of a motor vehicle.

Methods of the afore-mentioned type are known in the art. The tank of the tank device may, for example, be a fuel tank or an auxiliary material tank, with the auxiliary material being in particular a reducing agent. The tank usually always contains a fluid, that is, for example, fuel or auxiliary material in liquid form, and possibly also in gaseous form. The gaseous fluid mixes hereby with air prevalent in the tank. In particular when filling a fluid into the tank, but also when the fluid contained in the tank expands due to a rise in temperature, pressure rises in the tank. In conventional motor vehicles, it is now common to ventilate the tank via a filter device. The filter device includes, for example a filter, in particular an activated carbon filter. The latter is regenerated from time to time, which means that fresh air is guided through the filter in a direction of a running internal combustion engine of the motor vehicle. With the aid of fresh air, fluid previously trapped in the filter is discharged, conducted in the direction of the internal combustion engine, and subsequently combusted in it.

This approach is not directly applicable in motor vehicles with hybrid drive devices, because the hybrid drive device has in addition to the internal combustion engine a further drive unit, and the internal combustion engine is oftentimes not operated for a long period of time. During this time period, purging of the activated carbon filter is not possible. For this reason, the tank can be formed as a so-called pressure tank to withstand an internal pressure which sometimes is significantly greater than the ambient pressure in the surroundings of the tank device. In addition, there is no permanent vent connection between the tank and the filter device but can be interrupted by a valve unit. This valve unit has the switching valve, for example a solenoid valve. Excitation current can be applied to the switching valve which opens however only when the excitation current exceeds the excitation current threshold. Excitation current or excitation current threshold may relate hereby to a current or a voltage.

Such a tank device can experience icing, particularly at low ambient temperatures. This is especially the case, when condensate has previously formed in the valve device or the switching valve. For example, moist air is drawn from the surroundings of the tank device, when the tank is vented via the vent connection or during regeneration. The contained moisture condenses in the valve device and freezes subsequently. As a result, the valve device or the solenoid valve can seize, so that the vent connection can no longer be established thereafter. Accordingly, the tank cannot or only insufficiently be aerated and/or vented, so that the pressure in the tank becomes impermissibly high or low and damage to the tank is the result.

SUMMARY OF THE INVENTION

It is therefore an object of the invention to propose a method for operating a tank device which obviates the afore-mentioned drawback and which allows in particular a reliable operation of the tank device over a wide temperature range, especially when low outside temperatures are involved.

According to the invention, this is achieved with a method for operating a tank device of a motor vehicle, with the tank device having a tank as well as a tank ventilation device with at least one switching valve to which an excitation current can be applied and which opens only when the excitation current exceeds an excitation current threshold over a certain period of time, wherein in a first mode of operation, an excitation current which is greater than the excitation current threshold is applied, at least temporarily, to the switching valve for heating purposes, also when a control unit of the tank device does not provide for a ventilation of the tank. As a result of applying the excitation current, the switching valve or the entire valve device is heated. Accordingly, ice present in the switching valve and/or valve device can be thawed or even prevented from forming so that the tank can be aerated or vented without interference. In the first mode of operation, opening of the switching valve by applying the excitation current is acceptable, even though this is not necessarily the case. Application is executed even though the control unit of the tank device does not intend or provide for a ventilation of the tank.

This means that the control unit does not activate the switching valve for aerating or venting, for example because at this point in time it is not necessary or not desired. Still, the switching valve is acted upon by the excitation current which is also greater than the excitation current threshold. Opening of the switching valve is normally opposed by a spring force and the inertia force of moving parts of the switching valve. The excitation current threshold is normally directly dependent on the spring force, while this is true for the inertia force only to a small extent. This means overall, that the switching valve opens, when the excitation current at least corresponds to the excitation current threshold and is applied for a sufficiently long period of time to the switching valve, with the inertia force in particular delaying the process of opening.

A refinement of the invention provides that the first mode of operation is carried out, when an ambient temperature is lower than an ambient threshold temperature, and/or a fuel temperature of the tank, in particular a fluid temperature of fluid contained in the tank fluid, is lower than a fluid threshold temperature, and/or a tank internal pressure is lower than a threshold tank internal pressure. When the afore-mentioned criteria are met, it is normally not critical, when the switching valve at least partly opens when the excitation current, which is greater than the excitation current threshold, is applied, even though this is not intended by the control unit. The ambient threshold temperature is hereby, for example, a temperature of maximal 10° C., maximal 5° C. or maximal 0° C. In the presence of an ambient temperature that is smaller than such an ambient threshold temperature, it can normally be assumed that the proportion of the gaseous fluid in the tank is slight.

Accordingly, no or only a small amount of the (gaseous) fluid can flow in the direction of the filter device, even when the switching valve opens and thus when the vent connection is cleared. The same applies to the tank temperature, which is lower than the fluid threshold temperature. The latter can hereby be selected, for example in accordance with the afore-mentioned values for the ambient threshold temperature. The threshold tank internal pressure can be selected to correspond, for example, to an ambient pressure in the surroundings of the tank device. In the event, the tank internal pressure is lower than the latter, fluid is prevented from flowing in the direction of the filter device, even when the switching valve is open. Rather, a reverse flow direction is present so that air from the surroundings of the tank device can flow into the tank. This, however, is always permitted.

A refinement of the invention provides that applying the excitation current to the switching valve is executed in the first mode of operation for a time period which is selected such that the switching valve remains closed. As already mentioned above, the switching valve opens, when the excitation current exceeds the excitation current threshold, only when this occurs over a certain period of time. In the case of the solenoid valve, the displacement of a solenoid armature of the switching valve is opposed beforehand by its inertia or by an inertia force resulting from this inertia and the spring force acting on the solenoid armature. The period of time within which the excitation current is applied, should now be less than this particular period of time. As a result, the switching valve remains also fully closed in the first mode of operation, when the excitation current is applied. Preferably, a PWM control (PWM: Pulse Width Modulation) is used for applying the excitation current. As an alternative, provision may, of course, be made to select the time period such that the switching valve opens at least in part, in particular completely.

A refinement of the invention provides that an excitation current, which is smaller than the excitation current threshold, is applied, at least temporarily, to the switching valve for heating purposes in a second mode of operation. In contrast to the first mode of operation, the excitation current is thus always smaller than the excitation current threshold. Even when the excitation current is continuously applied to the switching valve, the latter does not open in the second mode of operation and thus remains fully closed. A constant excitation current may hereby be applied to the switching valve. As an alternative, a PWM control of the switching valve may also be provided here, in which the excitation current is periodically applied to the switching valve and switched off again.

A refinement of the invention provides that the second mode of operation is executed, when the ambient temperature is greater than the ambient threshold temperature, and/or the tank temperature of the tank, in particular the fluid temperature of the fluid contained in the tank, is greater than the fluid threshold temperature, and/or the tank internal pressure is greater than the threshold tank internal pressure. In addition, it may also already be sufficient when the respective value reaches the stated threshold value, so that the second mode of operation satisfies the respective condition when the ambient threshold temperature is reached by the ambient temperature, and/or when the fluid threshold temperature is reached by the tank temperature, and/or when the threshold tank internal pressure is reached by the tank internal pressure. In the event, at least one of the stated conditions is met, there is a certain likelihood that gaseous fluid inadvertently flows in the direction of the filter device, when the switching valve opens. This is prevented by carrying out the second mode of operation, in which the excitation current is always smaller than the excitation current threshold. In the second mode of operation, the switching valve thus remains closed at all times, when the ventilation of the tank is not governed by the control unit of the tank device.

A refinement of the invention provides that heating of the switching valve causes a heating of at least one pressure relief valve which is in heat transfer connection with the switching valve and connected in parallel relationship therewith. The valve device includes, therefore, the at least one pressure relief valve in addition to the switching valve. Depending on its orientation, the pressure relief valve provides the aerating or ventilation of the tank, as soon as the tank internal pressure falls below or exceeds a certain threshold pressure. The pressure relief valve is fluidly connected in parallel to the switching valve. Preferably, two pressure relief valves are provided, one of which opens as soon as the tank internal pressure exceeds a first threshold tank internal pressure, and a second of which opens as soon as the tank internal pressure drops below a second threshold tank internal pressure, with the first threshold tank internal pressure being greater than the second threshold tank internal pressure.

The pressure relief valve is passive, i.e. it does not have an electric actuator. Therefore, its temperature usually corresponds to the ambient temperature or is even below it, while being flowed through. Therefore, the pressure relief valve is much more susceptible to icing than the switching valve. To prevent its seizing, the pressure relief valve is in heat transfer connection with the switching valve. This means that heat generated as excitation current is applied to the switching valve is at least in part transferred to the pressure relief valve. Preferably, the pressure relief valve is accommodated for this purpose in a common valve housing with the switching valve.

A refinement of the invention provides that the excitation current is applied to the switching valve periodically or continuously. In the first case, the aforementioned PWM control of the switching valve is used for example, by which the excitation current is periodically switched on and off again during a certain period of time. In the latter case, the excitation current, which is applied to the switching valve, is kept constant over a certain period of time.

A refinement of the invention provides that the excitation current is selected in dependence on a desired heat output. The desired heat output can be selected either constant or variable depending on the ambient conditions. In the latter case, the desired heat output is established in dependence on the ambient temperature for example. The desired heat output is hereby the greater, the lower the ambient temperature. The excitation current required to ensure a reliable operation of the tank device and in particular of the valve device or the switching valve is determined on the basis of the desired heat output. Subsequently, the excitation current is adjusted at the switching valve. The desired heat output or the excitation current can be determined once at the start of operation of the tank device, or periodically at certain time intervals.

The invention further relates to a tank device of a motor vehicle, in particular for carrying out the method according to the foregoing description, with the tank device having a tank and a tank ventilation device with at least one switching valve to which an excitation current can be applied, wherein the switching valve opens only when the excitation current exceeds over a specific period of time a excitation current threshold. Provision is hereby made to configure a control unit of the tank device to apply an excitation current, which is greater than the excitation current threshold, to the switching valve for heating purposes in a first mode of operation, at least temporarily, also when the control unit does not provide for a ventilation of the tank. The advantages of such an approach have already been discussed. The used method can be refined according to the forgoing description.

BRIEF DESCRIPTION OF THE DRAWING

The invention will now be explained in more detail with reference to the exemplified embodiments shown in the drawings, without limiting the invention. It is shown in.

DETAILED DESCRIPTION OF PREFERRED EMBODIMENTS

Figure 1:
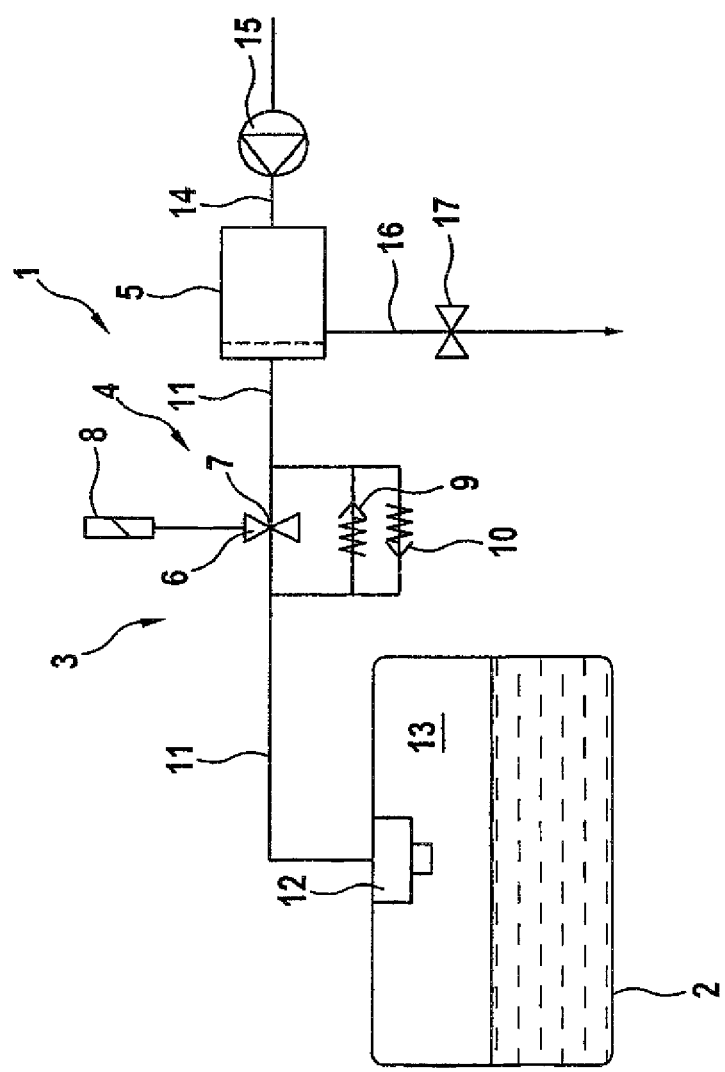
FIG. 1 a schematic illustration of a tank device of a motor vehicle, with the tank device including a valve device with at least one switching valve, FIG. 2 a diagram in which an excitation current of the switching valve is plotted as a function of time, and FIG. 3 a flow chart illustrating a method of operating the tank device.

FIG. 1 shows a schematic illustration of a tank device 1 of a motor vehicle. The tank device has a tank 2 and a tank ventilation device 3. A valve device 4 and a filter device 5 are in particular associated to the tank ventilation device 3. The valve device 4 includes a switching valve 6 with a cross-section-adjustment member 7 and an actuator 8 connected thereto, such as, for example, a solenoid armature with an associated coil. In the latter case, the switching valve 6 is configured in the form a solenoid valve. The valve device 4 also includes two oppositely directed pressure relief valves 9 and 10, which are connected in parallel relationship to each other and in addition to the switching valve 6. The filter device 5 is disposed in a vent connection 11, shown for example by a vent connection line, which is connected on one side to the tank 2 and on the other side to the filter device 5. On the side of the vent connection 11 in confronting relationship to the tank 2, provision can be made for a discharge prevention 12 in the form of a roll-over valve (ROV). The discharge prevention 12 is hereby provided between a tank interior 13 and the vent connection 11. A purging air connection 14 with a conveying device 15 and a connection 16 to an internal combustion engine of the motor vehicle are connected to the filter device 5 in addition to the vent connection 11. A switching valve 17 is disposed in the connection 16.

Especially at low ambient temperatures, the pressure in the tank interior 13 can drop precipitously. In the event, the tank internal pressure drops below a threshold tank internal pressure, the pressure relief valve 9 opens while the switching valve 6 is closed. Thus, air can flow from the surroundings of the tank device via the purging air connection 14 into the filter device and from there via the vent connection 11 into the tank 2 or the tank interior 13. Moisture may migrate together with air into the valve device 4 and in particular into the pressure relief valve 9 and deposits there in particular as condensate. When the (condensed) moisture then freezes, the pressure relief valve 9 may be blocked and also the pressure relief valve 10 or the switching valve 6. An excitation current is applied to the switching valve for opening. The switching valve 6 opens, however, only when the excitation current exceeds an excitation current threshold over a certain period of time.

Provision is now made to apply in a first mode of operation, at least temporarily, an excitation current, which is greater than the excitation current threshold, to the switching valve 6 for heating purposes, also when a ventilation of the tank is not governed by a not shown control unit of the tank device 1. This means that in the first mode of operation opening of the vent connection 11 is acceptable, even though ventilation of the tank 2 is not supposed to take place. It is especially preferred to therefore execute the first mode of operation only when an ambient temperature is lower than an ambient threshold temperature, a tank temperature of the tank is lower than a fluid threshold temperature, and/or a tank internal pressure is lower than a threshold tank internal pressure. In these cases, there is normally no flow through the vent connection 11 from the tank 2 in the direction of the filter device 5, even when the switching valve 6 is open. Rather, when the stated conditions are met, the tank internal pressure in the tank 2 is normally so small that the flow takes place in reverse direction, so that air flows into the tank 2. As a result, no gaseous fluid can exit the tank 2 in the direction of the filter device 5, when the switching valve 6 is open.

Provision can, however, be made to apply an excitation current to the switching valve 6 such that the switching valve remains closed in the first mode of operation, even though the excitation current exceeds the excitation current threshold. For this purpose, the period of time via which the excitation current is applied to the switching valve is selected such that the switching valve 6 remains closed. This is normally the case, when the excitation current is applied only for a short time to the switching valve 6, and this period of time is followed for a sufficiently long period of time without applying the excitation current to the switching valve 6. By applying the excitation current to the switching valve 6, it heats up. Preferably, a heat transfer connection or a heat conducting connection is disposed between the switching valve 6 and the pressure relief valves 9 and 10, respectively. For example, the switching valve 6 and the pressure relief valves 9 and 10 are disposed in a common valve housing (not shown). Heat generated by the switching valve 6 prevents via the heat transfer connections the pressure relief valves 9 and 10 from seizing as a result of icing. As a result, a reliable operation of the tank device 1 is ensured also at low temperatures.

Figure 2:
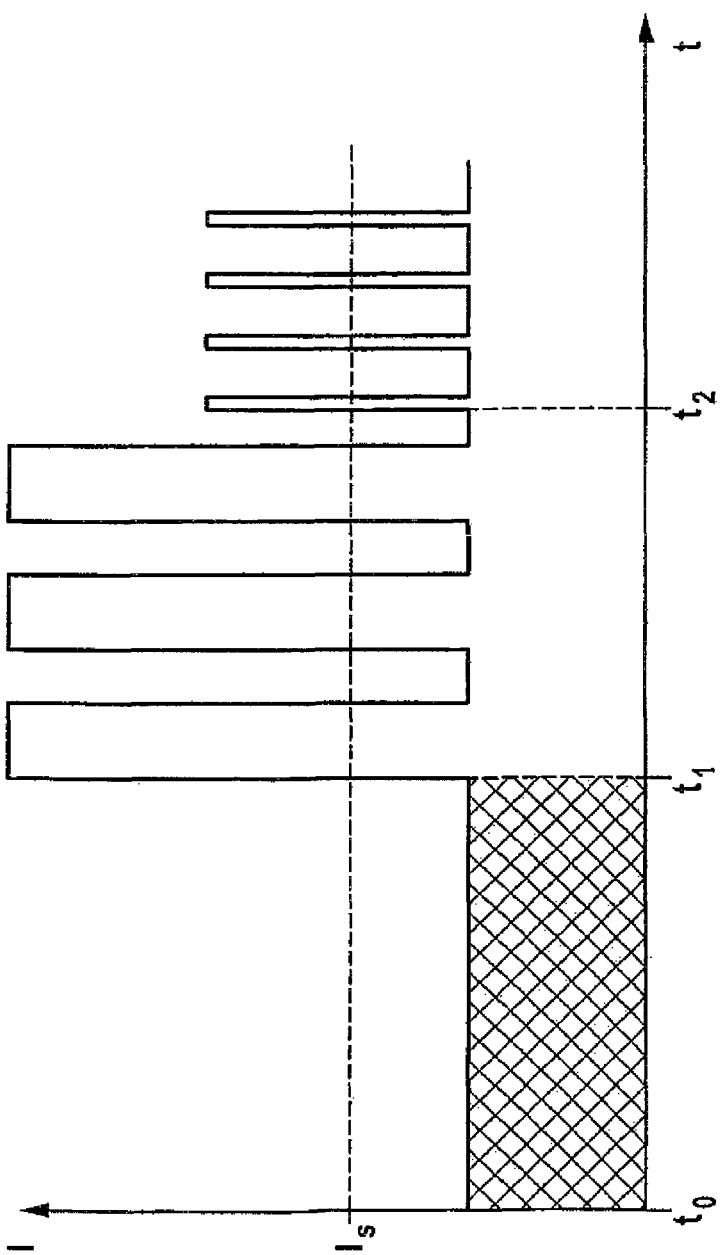

FIG. 2 shows a diagram in which an excitation current in the form of a current I of the switching valve 6 is plotted as a function of the time t. The excitation current threshold $I_s$ is also indicated. It becomes now apparent that between $t_0 \leq t < t_1$ the excitation current I is lower than the excitation current threshold $I_s$ and has hereby a constant course or a constant value. At the point in time $t=t_1$, the control unit of the tank device 1 provides for ventilation of the tank 2. Accordingly, an excitation current I is applied to the switching valve 6 and significantly exceeds, at least temporarily, the excitation threshold current $I_s$. This is the case up to the point in time $t \leq t_2$. For $t_1 \leq t < t_2$ the switching valve 6 is thus open.

Subsequently, excitation current I, which exceeds the excitation current threshold $I_s$, is also applied to the switching valve 6. This is the case from the point in time $t=t_2$. The time period during which the applying is respectively carried out is, however, selected short enough that the switching valve 6 remains closed. Applying the excitation current I to the switching valve 6 between $t_0 \leq t < t_1$ is executed in the second mode of operation, for $t \geq t_2$ in the first mode of operation. As an alternative, a constant value of the excitation current I as a function of the time may also be selected in the first mode of operation so that an opening of the switching valve 6 is accepted to heat the switching valve 6 and in addition the pressure relief valves 9 and 10, even though the control unit does not provide for the ventilation of the tank 2.

Figure 3:
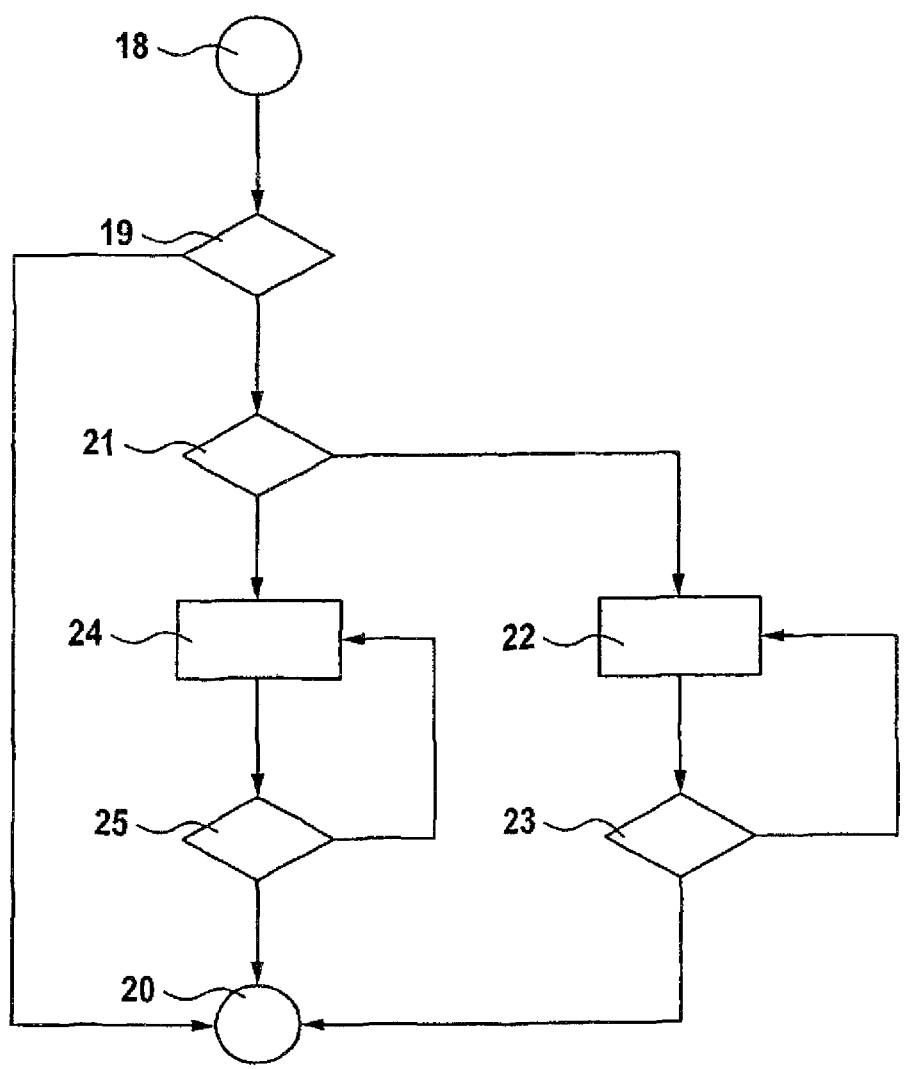

FIG. 3 shows a flow chart of a method for operating the tank device 1. The implementation of the method begins at a start point 18. A check is made thereafter at a branch 19 as to whether an ambient temperature is lower than a freezing temperature at which moisture in the pressure relief valves 9 and 10 and the switching valve 6 could freeze. If this is not the case, it is branched to an end point 20 of the process. In the event, the temperature is lower than or equal to the freezing temperature, the process is continued to branch 21. It is checked here as to whether a first or a second mode of operation is to be executed. For this purpose, it is preferably checked whether the ambient temperature is lower than the ambient threshold temperature, the tank temperature of the tank is lower than the fluid threshold temperature, and/or the tank internal pressure is lower than the threshold tank internal pressure. In the event, at least one of these conditions is met, the first mode of operation is executed, otherwise the second.

The first mode of operation is implemented by branching to an action 22 in which an excitation current I, which is greater than the excitation threshold current $I_s$, is applied to the switching valve 6 for heating purposes. The excitation current I can be selected depending on a desired heat output, which in turn depends in particular on the ambient temperature and/or a capacity of the tank 2. After the excitation current I has been applied to the switching valve 6 in the first mode of operation, for example over a certain period, it is checked at branch 23 whether the ambient temperature exceeds the freezing temperature and/or whether at least one temperature of the valve device 4 is greater than the freezing temperature. If this is not the case, it is branched back to action 22. Otherwise, the process is concluded at end point 20.

Conversely, in the event the second mode of operation should be executed, an action 24 is triggered from the branch 21, during which action an excitation current I, which is lower than the excitation current threshold $I_s$, is applied to the switching valve 6. Subsequently, it is checked at branch 25, analog to branch 23, as to whether the ambient temperature and/or the temperature of the valve device 4 is greater than the freezing temperature. If this is not the case, action 24 is executed again. Otherwise, the process is concluded at end point 20.

The invention claimed is:

1. A method for operating a tank device of a motor vehicle, comprising:
    applying an excitation current to at least one switching valve of the tank device, with the switching valve opening only when the excitation current exceeds an excitation current threshold over a certain period of time to effect a ventilation of a tank of the tank device;
    heating the switching valve in a first mode of operation by applying, at least temporarily, the excitation current, which is greater than the excitation current threshold, also when the ventilation of the tank of the tank device is not governed by a control unit of the tank device so as to prevent icing in the switching valve; and
    applying, at least temporarily, the excitation current, which is lower than the excitation current threshold, to the switching valve for heating purposes in a second mode of operation, wherein the second mode of operation is executed, when at least one criterion selected from the group consisting of an ambient temperature greater than an ambient threshold temperature, a tank temperature of the tank greater than a fluid threshold temperature of a fluid contained in the tank, and a tank internal pressure greater than a threshold tank internal pressure, is met.

2. The method of claim 1, wherein the first mode of operation is executed, when at least one criterion selected from the group consisting of an ambient temperature lower than an ambient threshold temperature, a tank temperature of the tank lower than a fluid threshold temperature of a fluid contained in the tank, and a tank internal pressure lower than a threshold tank internal pressure, is met.

3. The method of claim 2, wherein the tank temperature is a fluid temperature of the fluid contained in the tank.

4. The method of claim 1, wherein the excitation current is applied to the switching valve in the first mode of operation for a time period which is selected such that the switching valve remains closed.

5. The method of claim 1, wherein the tank temperature is a fluid temperature of the fluid contained in the tank.

6. The method of claim 1, further comprising heating at least one pressure relief valve disposed in heat-transfer connection and in parallel relationship to the switching valve as the switching valve is heated.

7. The method of claim 1, wherein the excitation current is applied to the switching valve periodically or continuously.

8. The method of claim 7, wherein the excitation current is applied periodically by pulse width modulation.

9. The method of claim 1, wherein the excitation current is selected as a function of a desired heat output.

10. A tank device of a motor vehicle, comprising:
    a tank;
    a tank ventilation device having at least one switching valve to which an excitation current can be applied and which opens only when the excitation current exceeds an excitation current threshold over a certain period of time; and
    a control unit configured to heat the switching valve by applying, at least temporarily, in a first mode of operation the excitation current which is greater than the excitation current threshold, also when a ventilation of the tank is not governed by the control unit so as to prevent icing in the switching valve, said control unit being configured to apply, at least temporarily, the excitation current, which is lower than the excitation current threshold to the switching valve for heating purposes in a second mode of operation, wherein the second mode of operation is executed, when at least one criterion selected from the group consisting of an ambient temperature greater than an ambient threshold temperature, a tank temperature of the tank greater than a fluid threshold temperature of a fluid contained in the tank, and a tank internal pressure greater than a threshold tank internal pressure, is met.

11. The tank device of claim 10, wherein the tank temperature is a fluid temperature of the fluid contained in the tank.

* * * * *